US011286886B2

United States Patent
Himmelmann

(10) Patent No.: US 11,286,886 B2
(45) Date of Patent: Mar. 29, 2022

(54) DISTRIBUTED FUEL MODULES WITH HYDRAULIC FLOW CIRCUIT BREAKERS AND GASEOUS FLOW CIRCUIT BREAKERS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 379 days.

(21) Appl. No.: 16/383,627

(22) Filed: Apr. 14, 2019

(65) Prior Publication Data

US 2020/0326730 A1    Oct. 15, 2020

(51) Int. Cl.
| | | |
|---|---|---|
| *F02K 9/50* | (2006.01) | |
| *F02K 9/56* | (2006.01) | |
| *B64G 1/40* | (2006.01) | |
| *F23K 5/16* | (2006.01) | |
| *F16K 17/28* | (2006.01) | |
| *G05D 7/01* | (2006.01) | |
| *H01H 71/12* | (2006.01) | |
| *F02K 9/54* | (2006.01) | |
| *F02K 9/58* | (2006.01) | |

(52) U.S. Cl.
CPC .............. *F02K 9/566* (2013.01); *B64G 1/402* (2013.01); *F02K 9/50* (2013.01); *F23K 5/16* (2013.01); *F02K 9/54* (2013.01); *F02K 9/58* (2013.01); *F16K 17/28* (2013.01); *G05D 7/012* (2013.01); *G05D 7/0193* (2013.01); *H01H 71/12* (2013.01)

(58) Field of Classification Search
CPC ...... G05D 7/0193; G05D 7/012; F16K 17/28; F16K 17/20–34; H01H 71/12; F23K 5/147; F23K 5/16; F23K 2900/05001; F02C 7/22; F01D 15/10; F05D 2250/76; F05D 2250/82; F02K 9/50; F02K 9/566; F02K 9/58; F02K 9/605; F02K 9/42–68; B64G 1/402; F17C 2205/0332
See application file for complete search history.

(56) References Cited

U.S. PATENT DOCUMENTS 2,612,019 A *  9/1952  Halford ..................... F02K 9/58
                                                 60/227
2,612,752 A   10/1952  Goddard
(Continued)

OTHER PUBLICATIONS

European Search Report for Application No. 19215775.8, dated Jun. 18, 2020, 7 pages.
(Continued)

*Primary Examiner* — Gerald L Sung
*Assistant Examiner* — Rene D Ford
(74) *Attorney, Agent, or Firm* — Cantor Colburn LLP

(57) ABSTRACT

A distributed fuel module includes a fuel pressure vessel with a gas port and a fuel port, a hydraulic circuit breaker connected to the fuel port, and a gaseous circuit breaker. The gaseous circuit breaker is connected to the gas port, is fluidly coupled to the hydraulic circuit breaker through the fuel pressure vessel, and is cooperatively associated with the gaseous circuit breaker to isolate the fuel pressure vessel from a compressed gas header and a fuel header according to pressure differential within the hydraulic circuit breaker and pressure differential within the gaseous circuit breaker. Power modules and methods of controlling fuel flow in fuel modules are also described.

17 Claims, 6 Drawing Sheets

(56) References Cited

U.S. PATENT DOCUMENTS

| | | | | |
|---|---|---|---|---|
| 3,013,388 | A | * | 12/1961 | Loughran .................. F02K 9/52 |
| | | | | 60/39.462 |
| 3,138,928 | A | * | 6/1964 | Oppenheimer ......... B64G 1/402 |
| | | | | 60/39.48 |
| 3,714,777 | A | * | 2/1973 | Ferris ........................ F02K 9/58 |
| | | | | 60/39.48 |
| 3,722,217 | A | | 3/1973 | Reynolds et al. |
| 4,385,489 | A | | 5/1983 | Abbott |
| 4,867,199 | A | * | 9/1989 | Marx ..................... F16K 15/038 |
| | | | | 137/512.1 |
| 4,880,185 | A | * | 11/1989 | Apfel ....................... B64G 1/26 |
| | | | | 244/135 B |
| 5,263,666 | A | * | 11/1993 | Hubert ................... B64G 1/242 |
| | | | | 244/169 |
| 5,880,356 | A | * | 3/1999 | Delepierre-Massue ...................... |
| | | | | G01F 23/14 |
| | | | | 73/37 |
| 7,140,386 | B2 | | 11/2006 | Avis et al. |
| 8,191,571 | B2 | * | 6/2012 | Himmelmann ....... F16K 15/033 |
| | | | | 137/521 |
| 9,097,210 | B2 | * | 8/2015 | Delong ...................... F02K 1/76 |
| 2016/0312652 | A1 | * | 10/2016 | Himmelmann ........... F01D 9/02 |
| 2016/0312743 | A1 | * | 10/2016 | Himmelmann ..... F04D 15/0077 |

OTHER PUBLICATIONS

EPO Official Letter for Application No. 19215775.8, dated Sep. 7, 2021, 4 pages.

* cited by examiner

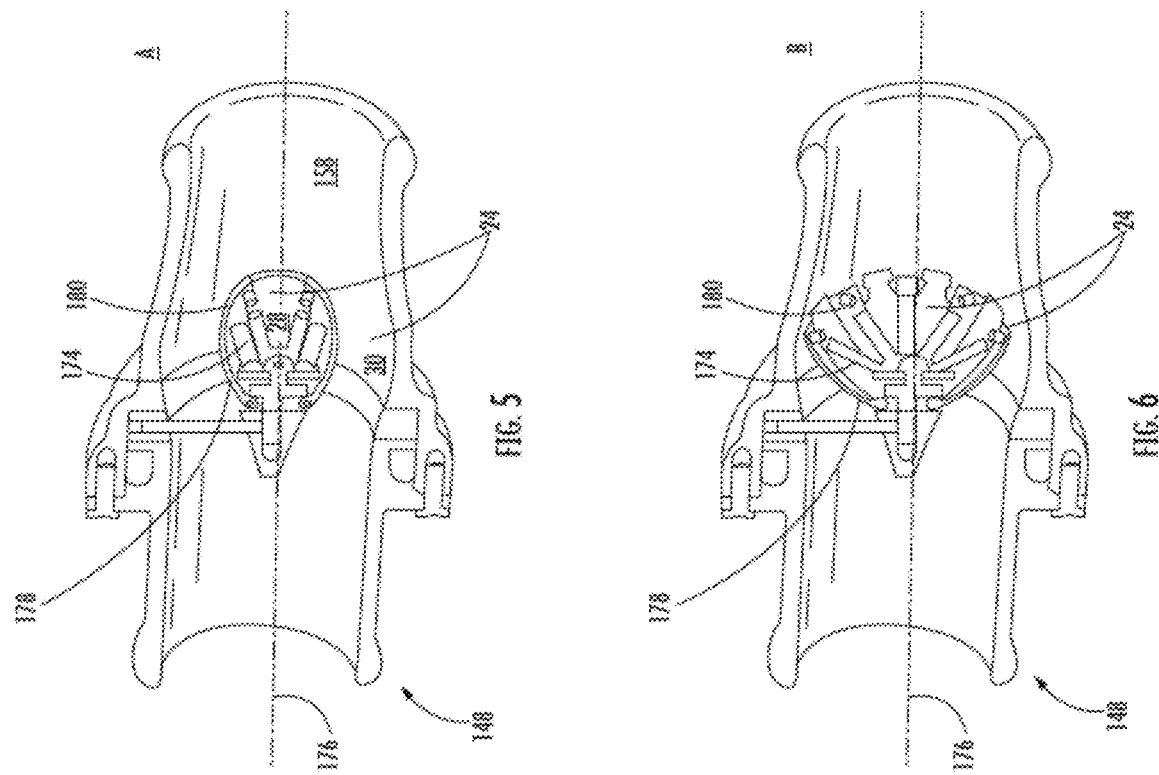

DISTRIBUTED FUEL MODULES WITH HYDRAULIC FLOW CIRCUIT BREAKERS AND GASEOUS FLOW CIRCUIT BREAKERS

BACKGROUND

The present disclosure generally relates to flow control in fluid systems, and more particularly to flow control in fluid systems having distributed fluid storage vessels.

Fuel systems are commonly employed to provide fuel to devices requiring chemical energy, such as engines. The flow of fuel is typically regulated by flow control devices like valves and throttles to match the flow of fuel to the desired output of the engine. In some fuel systems it can be necessary to control the flow of fuel such that a breach of the fuel system limits spillage of fuel from the fuel system. For example, fuel tanks are commonly surrounded by an impermeable material within a berm. The berm contains fuel in the event of leakage and the impermeable material prevents infiltration of leaked fuel into the soil surrounding the tank. Mobile fuel tanks, such as in vehicles may include leak detectors and typically undergo cyclic inspections to monitor for fuel leakage.

Such systems and methods have generally been satisfactory for their intended purpose. However, there remains a need for improved distributed fuel modules, power modules, and methods to control fuel flow in distributed fuel modules. The present disclosure provides a solution to this need.

BRIEF DESCRIPTION

A distributed fuel module is provided. The distributed fuel module includes a fuel pressure vessel with a gas port and a fuel port, a hydraulic circuit breaker connected to the fuel port, and a gaseous circuit breaker. The gaseous circuit breaker is connected to the gas port and is fluidly coupled with the hydraulic circuit breaker through the fuel pressure vessel. The hydraulic circuit breaker is cooperatively associated with the gaseous circuit breaker to isolate the fuel pressure vessel from a compressed gas header and a fuel header according to pressure differential within the hydraulic circuit breaker and pressure differential within the gaseous circuit breaker.

In addition to one or more of the features described above, or as an alternative, further embodiments may include that the hydraulic circuit breaker includes a plurality of arcuate petals supported along a flow axis, each of the arcuate petals is movable between a flow-unobstructed open position, wherein the hydraulic circuit breaker does not obstruct flow into the fuel port, and a flow-obstructed closed position, wherein the hydraulic circuit breaker prevents fuel flow into the fuel port.

In addition to one or more of the features described above, or as an alternative, further embodiments may include that the gaseous circuit breaker includes a plurality of arcuate petals supported along a flow axis, each of the arcuate petals movable between a flow-unobstructed open position, wherein the gaseous circuit breaker does not obstruct flow into the gas port, and a flow-obstructed closed position, wherein the gaseous circuit breaker prevents gas flow into the fuel pressure vessel.

In addition to one or more of the features described above, or as an alternative, further embodiments may include a pressure regulator connected to the fuel pressure vessel by the gaseous circuit breaker.

In addition to one or more of the features described above, or as an alternative, further embodiments may include a turbine speed control valve connected to the fuel pressure vessel by the hydraulic circuit breaker.

In addition to one or more of the features described above, or as an alternative, further embodiments may include a fuel header connected to the fuel pressure vessel by the hydraulic circuit breaker.

In addition to one or more of the features described above, or as an alternative, further embodiments may include a compressed gas header connected to the fuel pressure vessel by the gaseous circuit breaker.

In addition to one or more of the features described above, or as an alternative, further embodiments may include a liquid fuel charge contained within the fuel pressure vessel, and a compressed gas charge contained within the compressed gas pressure vessel and the fuel pressure vessel, the compressed gas charge urging the liquid fuel charge toward the fuel port of the fuel pressure vessel.

In addition to one or more of the features described above, or as an alternative, further embodiments may include a liquid fuel flow through the hydraulic circuit breaker in operative association with the hydraulic circuit breaker.

In addition to one or more of the features described above, or as an alternative, further embodiments may include a compressed gas flow through the gaseous circuit breaker in operative association with the gaseous circuit breaker.

In addition to one or more of the features described above, or as an alternative, further embodiments may include that the fuel pressure vessel is a first fuel pressure vessel, that the hydraulic circuit breaker is a first hydraulic circuit breaker, and that the gaseous circuit breaker is a first gaseous circuit breaker. The distributed fuel module may additionally include a second fuel pressure vessel with a gas port and a fuel port, a second hydraulic circuit breaker connected to the fuel port of the second fuel pressure vessel, a fuel header connecting the first hydraulic circuit breaker with the second hydraulic circuit breaker, a second gaseous circuit breaker connected to the gas port of the second fuel pressure vessel, and a gas header connecting the first gaseous circuit breaker with the second gaseous circuit breaker.

In addition to one or more of the features described above, or as an alternative, further embodiments may include a compressed gas pressure vessel with a gas port, a gas header gaseous circuit breaker connected to the gas port of the compressed gas pressure vessel, and a gas header connecting the gas header gaseous circuit breaker to the gaseous circuit breaker.

In addition to one or more of the features described above, or as an alternative, further embodiments may include that the fuel pressure vessel has no additional ports beyond the gas port and the fuel port.

A power module is also provided. The power module includes a distributed fuel module as described above. A liquid fuel charge is contained within the fuel pressure vessel and a compressed gas charge is contained within the compressed gas pressure vessel and a portion of the fuel pressure vessel, the compressed gas charge urging the liquid fuel charge toward the fuel port of the fuel pressure vessel. A pressure regulator is fluidly coupled to the fuel pressure vessel through the gaseous circuit breaker by the compressed gas charge. A turbine speed control valve is fluidly coupled to the fuel pressure vessel through the hydraulic circuit breaker by the liquid fuel charge.

In addition to one or more of the features described above, or as an alternative, further embodiments may include a fuel header fluidly coupled to the fuel pressure vessel through the hydraulic circuit breaker by the liquid fuel charge, a compressed gas header fluidly coupled to the fuel pressure vessel through the gaseous circuit breaker by the compressed gas charge, a liquid fuel flow through the hydraulic circuit breaker being operatively associated with the hydraulic circuit breaker, and a compressed gas flow through the gaseous circuit breaker is operatively associated with the gaseous circuit breaker.

In addition to one or more of the features described above, or as an alternative, further embodiments may include a gas generator fluidly connected to the turbine speed control valve, a turbine fluidly connected to the gas generator, and an electric generator operatively associated with the turbine for generator electrical power using the fuel charge contained in the fuel pressure vessel and urged toward the turbine speed control valve by the compressed gas charge contained in the fuel pressure vessel.

In addition to one or more of the features described above, or as an alternative, further embodiments may include that the gas generator includes a decomposition chamber configured to decompose a mono-propellent carried to the gas generator by the liquid fuel charge In addition to one or more of the features described above, or as an alternative, further embodiments may include that the gas generator comprises a combustion chamber configured to oxidize liquid fuel carried to the gas combustion chamber by the liquid fuel charge.

A method of controller fuel flow in a fuel module is additionally provided. The method includes charging a fuel pressure vessel having a gas port and a fuel port with a liquid fuel and pressurizing the liquid fuel with a compressed gas communicated to the fuel pressure vessel through the gas port. Liquid fuel is flowed through a hydraulic circuit breaker connected to the fuel port when pressure differential within a hydraulic circuit breaker is below a predetermined pressure differential. Compressed gas flows through the gas port when the pressure differential within a gaseous circuit breaker is below a predetermined pressure differential.

In addition to one or more of the features described above, or as an alternative, further embodiments may include ceasing flow of liquid fuel through the hydraulic circuit breaker when the pressure differential within the hydraulic circuit breaker exceeds the predetermined pressure differential, and ceasing flow of compressed gas through the gaseous circuit breaker when the pressure differential within the gaseous circuit breaker exceeds the predetermined pressure differential.

Technical effects of the present disclosure includes the capability to retain the capability to generate power using a pressurized distributed fuel module in the event that one or more of the fuel pressure vessels of the distributed fuel module experiences a breach. In certain embodiments capability is provided for two way flow to and from depressurization-protected fuel pressure vessels, thereby allowing the fuel pressure vessels to be charged with liquid fuel while preventing full depressurization should one or more the depressurization-protected fuel pressure vessels be breached.

BRIEF DESCRIPTION OF THE DRAWINGS

The following descriptions should not be considered limiting in any way. With reference to the accompanying drawings, like elements are numbered alike:

FIGS. 5 and 6 are cross-sectional views of a gaseous circuit breaker of the distributed fuel module FIG. 1, showing a plurality of the petals of the gaseous circuit breaker in flow-unobstructed, closed positions, and in flow-obstructed, open positions, respectively according to differential pressure within the gaseous circuit breaker.

DETAILED DESCRIPTION

Figure 1:
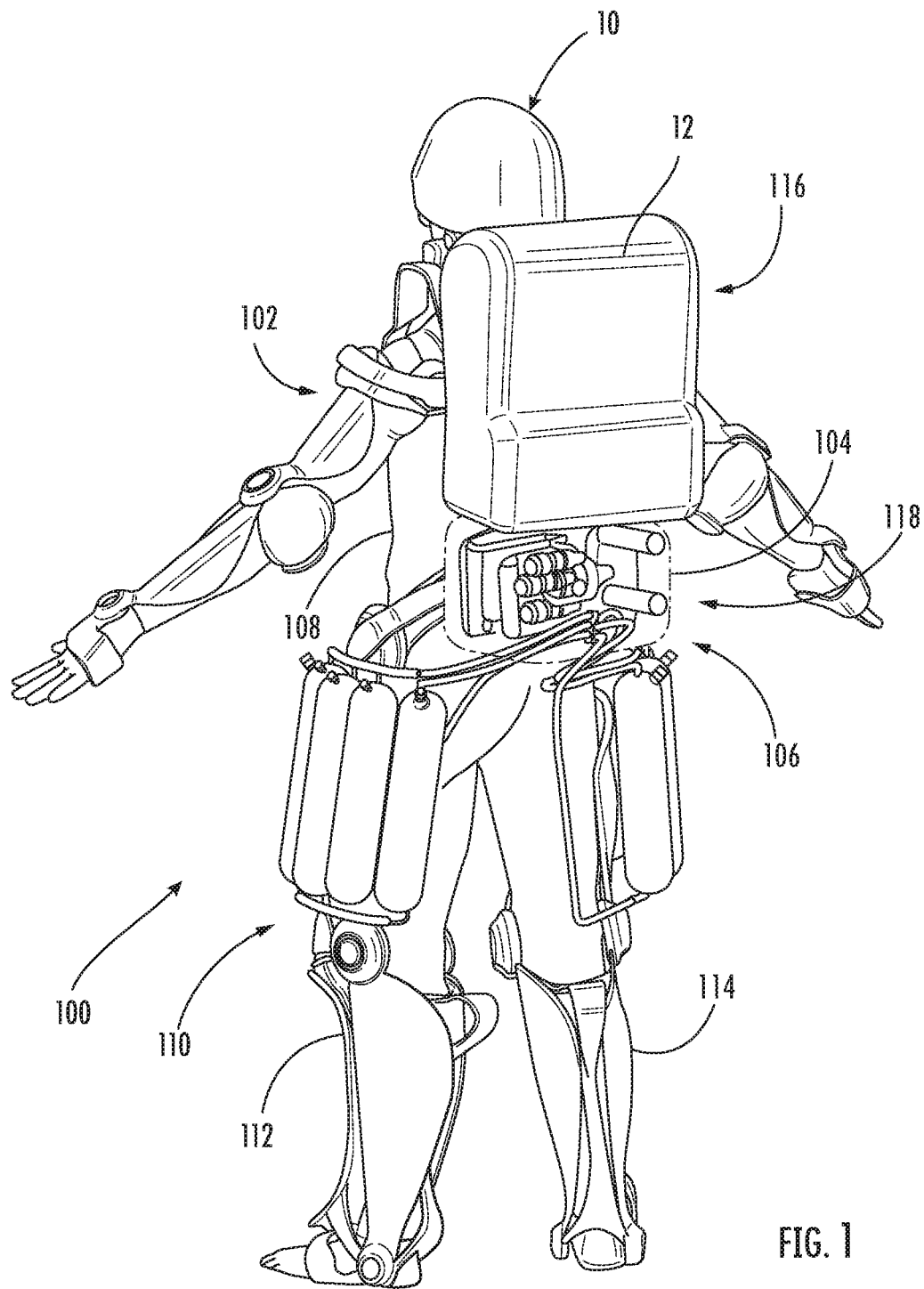
FIG. 1 is a perspective view of a power module constructed in accordance with the present disclosure, showing a turboalternator connected to a distributed fuel module to generate electric power using a flow of fuel provided by the distributed fuel module.

Reference will now be made to the drawings wherein like reference numerals identify similar structural features or aspects of the subject disclosure. For purposes of explanation and illustration, and not limitation, an exemplary embodiment of a distributed fuel module in accordance with the disclosure is shown in FIG. 1 and is designated generally by reference character 100. Other embodiments of distributed fuel modules, power modules, and methods of controlling fuel flow in fuel modules in accordance with the present disclosure, or aspects thereof, are provided in FIGS. 2-7, as will be described. The systems and methods described herein can be used for providing fuel from distributed fuel modules to power modules with isolation capability in the event of breach, such as in wearable power modules in military applications, though the present disclosure is not limited to wearable power modules or to military applications in general.

Referring to FIG. 1, a power module 106, e.g., a wearable power module, is shown. The power module 106 includes the distributed fuel module 100, a harness 102, and a turboalternator 104. The harness 102 is configured and adapted for wear by a user 10 and includes a torso segment 108 and limb segment 110. The limb segment 110 includes a left leg portion 112 and a right leg portion 114. The torso segment 108 includes a shoulder portion 116 and a lower back portion 118. The turboalternator 104 is supported by the lower back portion 118 of the harness 102 and the distributed fuel module 100 is supported by the limb segment 110 of the harness 102 such that the shoulder portion 116 of the torso segment 108 is free for supporting a cargo pack 12, e.g., a military-type ruck sack. As will be appreciated by those of skill in the art in view of the present disclosure, other types of cargo packs and mechanical loads can be supported by the shoulder portion 116 of the torso segment 108 and remain within the scope of the present disclosure.

Figure 2:
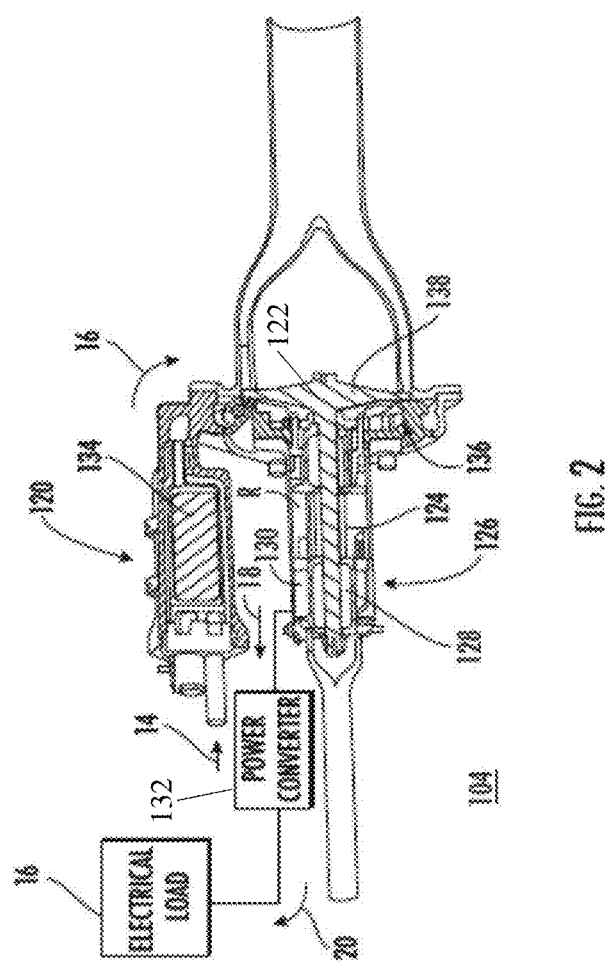
FIG. 2 is a cross-sectional view of the turboalternator of FIG. 1, showing a gas generator fluidly connecting the distributed fuel module to a turbine of the turboalternator.

With reference to FIG. 2, the turboalternator 104 is shown. The turboalternator 104 includes a gas generator 120, a turbine 122, and a connecting shaft 124. The turboalternator 104 also includes a permanent magnet generator 126 with a permanent magnet 128 and a stator winding 130, and a power converter 132.

The gas generator 120 includes a decomposition or combustion chamber 134, is in fluid communication with the distributed fuel module 100 (shown in FIG. 1), and is in fluid communication with the turbine 122. The decomposition or combustion chamber 134 receives a flow of liquid fuel 14 from the distributed fuel module 100 through a turbine speed control valve 158, generates high pressure decomposition or combustion products 16 from the flow of liquid fuel 14, and communicates the high pressure decomposition or combustion products 16 to the turbine 122. In certain embodiments the liquid fuel 14 is a mono-propellant like hydrazine or Otto fuel suitable for generating high pressure decomposition products without utilization of an oxidizer. In accordance with certain embodiments the liquid fuel can be gasoline, diesel fuel, or a kerosene-based fuel like JP-8 suitable for generating high pressure combustion products utilizing an oxidizer, such as compressed air.

The turbine 122 is in fluid communication with the gas generator 120 and is operatively connected to the permanent magnet generator 126 through the connecting shaft 124. It is contemplated that the turbine 122 be configured to receive the high pressure decomposition or combustion products 16 from the gas generator 120, expand the high pressure decomposition or combustion products 16, and extract work from the high pressure decomposition or combustion products 16 to rotate the permanent magnet 128 of the permanent magnet generator 126. In this respect the turbine 122 is operatively connected to the permanent magnet generator 126 and communicates work extracted from the high pressure decomposition or combustion products 16 through the connecting shaft 124 as mechanical rotation R. In certain embodiments the turbine 122 includes an impulse turbine 136, which allows the turbine 122 to be radially compact, e.g., having a diameter of about four (4) inches. In accordance with certain embodiments the turbine 122 includes a single stage 138, which allows the turbine 122 to be axially compact.

The permanent magnet generator 126 is configured and adapted for generating variable frequency alternating current (AC) power 18. In this respect the permanent magnet 128 is fixed in rotation relative to the connecting shaft 124 and is magnetically coupled to the stator winding 130 such that rotation of the permanent magnet 128 induces a flow of variable frequency AC current in the stator winding 130. The stator winding 130 is in turn electrically connected to the power converter 132, which converts the variable frequency AC power 18 into direct current (DC) power 19, which the power converter 132 communicates to an electrical load 22 connected to the power converter 132. Examples of electrical loads include directed energy weapons, exoskeletons, and mobility and load support mechanisms.

Figure 3:
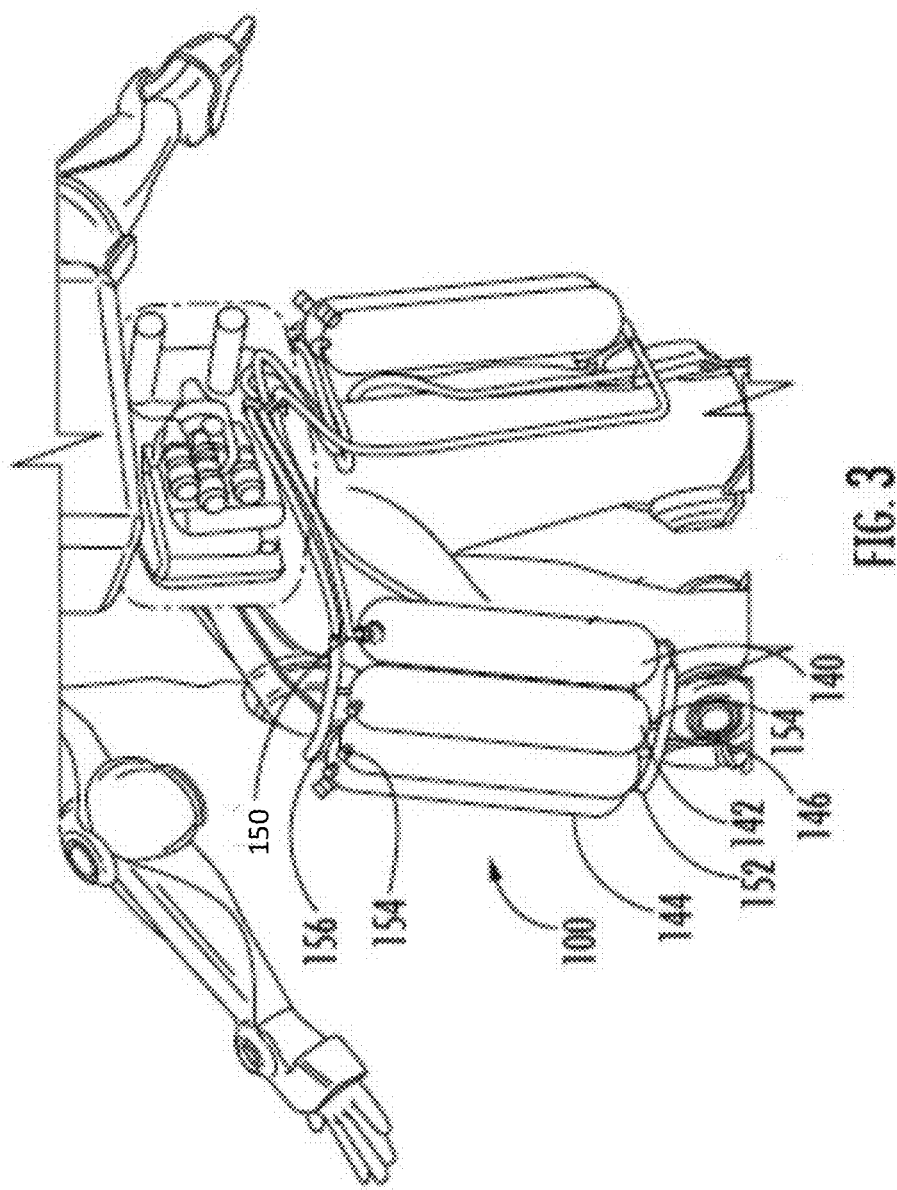
FIG. 3 is a perspective view of the distributed fuel module of FIG. 1, showing gaseous circuit breakers and hydraulic circuit breakers connecting a compressed gas pressure vessel to fuel pressure vessels for supplying fuel to the turboalternator.

With reference to FIG. 3, the distributed fuel module 100 is shown. The distributed fuel module 100 includes at least one compressed gas pressure vessel 140, a first fuel pressure vessel 142, and at least one second fuel pressure vessel 144. The distributed fuel module 100 also includes a compressed gas header 146 with a supply gaseous circuit breaker 148 (shown in FIG. 4), a pressure regulator 150 (shown in FIG. 4), a first gaseous circuit breaker 152, and a second gaseous circuit breaker 154. The distributed fuel module 100 also includes a fuel header 156 having a first hydraulic circuit breaker 157 and a second hydraulic circuit breaker 160. Although shown and described herein in the context of an embodiment having one (1) compressed gas pressure vessel and two (2) fuel pressure vessels, it is to be understood and appreciated that distributed fuel modules having more than one (1) compressed gas pressure vessel and more than two (2) fuel pressure vessels can also benefit from the present disclosure.

Figure 4:
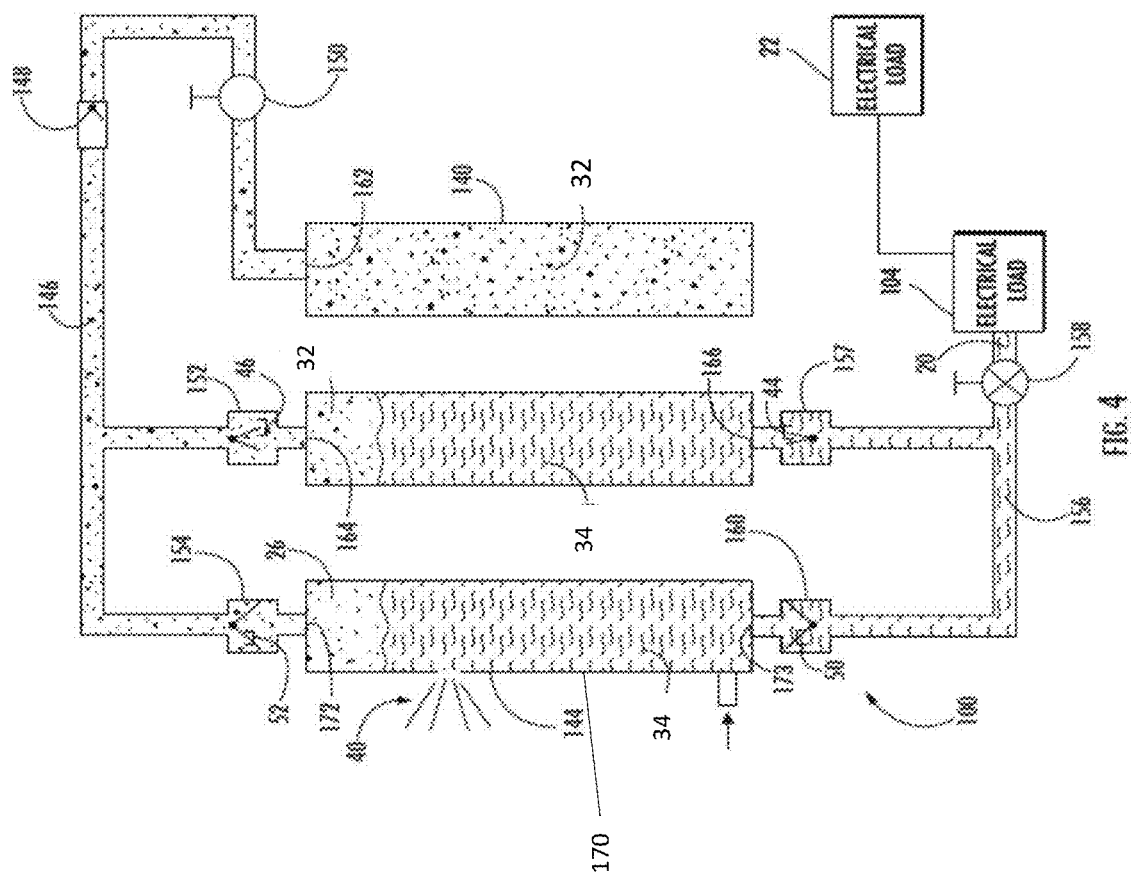
FIG. 4 is a schematic view of the distributed fuel module of FIG. 1, showing one of the gaseous circuit breakers and one of the hydraulic circuit breakers isolating a breached fuel pressure vessel from the remainder of the distributed fuel module to allow continued operation of the turboalternator notwithstanding the breach of the fuel pressure vessel.

With reference to FIG. 4, the distributed fuel module 100 is shown schematically. The compressed gas pressure vessel 140 has a gas port 162 and is configured for containing within its interior a compressed gas charge 34. Examples of suitable compressed gas charges include inert gases, such as substantially pure nitrogen, and oxidizers, such as compressed air by way of non-limiting examples.

The first fuel pressure vessel 142 has a gas port 164, a fuel port 166, and an interior 168. It is contemplated that the first fuel pressure vessel 142 be configured to contain within the interior 168 a liquid fuel charge 32 and a portion of the compressed gas charge 34, which is communicated thereto by the compressed gas pressure vessel 140. Examples of suitable liquid fuels include mono-propellants suitable for generating high pressure flows of decomposition products in the decomposition or combustion chamber 134 (shown in FIG. 2), such as hydrazine and Otto fuel by way of non-limiting examples. Examples of suitable liquid fuels also include liquid fuels suitable for generating high pressure flows of combustion products in the decomposition or combustion chamber 134 utilizing an oxidizer, such as gasoline, diesel fuel, or kerosene-based fuels like JP-8 by way of non-limiting examples. The second fuel pressure vessel 144 is similar to the first fuel pressure vessel 142, and additionally has an interior 170, a gas port 172, and a fuel port 173.

The compressed gas header 146 connects the compressed gas pressure vessel 140 with the first fuel pressure vessel 142 and the second fuel pressure vessel 144. In this respect the pressure regulator 150, the supply gaseous circuit breaker 148, the first gaseous circuit breaker 152, and the second gaseous circuit breaker 154 are each connected to one another by the compressed gas header 146. Specifically, the pressure regulator 150 is connected to the gas port 162 of the compressed gas pressure vessel 140. The supply gaseous circuit breaker 148 is connected to the pressure regulator 150. The first gaseous circuit breaker 152 is connected to the supply gaseous circuit breaker 148, is additionally connected to the gas port 164 of the first fuel pressure vessel 142, and connects the compressed gas pressure vessel 140 therethrough with the first fuel pressure vessel 142. The second gaseous circuit breaker 154 is connected to the supply gaseous circuit breaker 148, is additionally connected to the gas port 172 of the second fuel pressure vessel 144, and connects the compressed gas pressure vessel 140 therethrough with the second fuel pressure vessel 144.

The fuel header 156 connects the first fuel pressure vessel 142 and the second fuel pressure vessel 144 with the turbine speed control valve 158. Specifically, the first hydraulic circuit breaker 157 connects the fuel port 166 of the first fuel pressure vessel 142 to the fuel header 156, and therethrough to the turbine speed control valve 158. The second hydraulic circuit breaker 160 connects the fuel port 173 of the second fuel pressure vessel 144 to the fuel header 156, and therethrough to the turbine speed control valve 158. This allows the compressed gas charge 34 to force fuel from the liquid fuel charge 32 contained within the first fuel pressure vessel 142 and the second fuel pressure vessel 144 toward the turbine speed control valve 158. The turbine speed control valve 158 in turn regulates a flow of fuel 20 to the turboalternator 104 (shown in FIG. 1) based on a constant pressure imparted by the compressed gas charge 34. The constant pressure is determined by the setting the pressure regulator 150, which allows the turboalternator 104 to operate without a fuel pump, such as a variable orifice plate or other structure to throttle flow of fuel to the turboalternator 104 and thereby control the power output from the turboalternator 104.

As will be appreciated by those of skill in the art in view of the present disclosure, breach of the compressed gas pressure vessel 140, the first fuel pressure vessel 142, and/or the second fuel pressure vessel 144 can interfere with operation of the turboalternator 104. For example, a breach, e.g., a breach 40 in the second fuel pressure vessel 144, can cause each of the pressure vessels within the distributed fuel module 100 to depressurize due to the connectivity provided by the fuel header 156 and the compressed gas header 146. To limit the risk of a breach in any of the pressure vessels in the distributed fuel module 100 causing depressurization of the remainder of the distributed fuel module 100 gaseous circuit breakers and hydraulic circuit breakers are provided. In this respect the supply gaseous circuit breaker 148 is connected to the gas port 162 of the compressed gas pressure vessel 140. The supply gaseous circuit breaker 148 is configured to allow fluid communication between the compressed gas pressure vessel 140 and the compressed gas header 146 when pressure differential within the supply gaseous circuit breaker 148 is below a predetermined pressure differential, and is further configured to isolate the compressed gas pressure vessel 140 from the compressed gas header 146 when pressure differential within the supply gaseous circuit breaker 148 is above the predetermined value.

With reference to FIGS. 5 and 6, the supply gaseous circuit breaker 148 is shown. The supply gaseous circuit breaker 148 includes a plurality of arcuate petals 174 arranged along a flow axis 176 and distributed circumferentially about the flow axis 176. Each of the plurality of arcuate petals 174 have a first end 178 and an axially opposite second end 180, and are pivotably supported along the flow axis 176 at the first end 178 such that the second end 180 is disposed radially outward of the first end 178. Each of the plurality of arcuate petals 174 are movable between a radially inner flow-unobstructed closed position A (shown in FIG. 5), wherein flow through the supply gaseous circuit breaker 148 is unobstructed, and a radially outer flow-obstructed open position B (shown in FIG. 6), wherein the flow through the supply gaseous circuit breaker 148 is obstructed (or occluded completely). As will be appreciated by those of skill in the art in view of the present disclosure, when in the flow-obstructed position B, fluid communication between the compressed gas header 146 (shown in FIG. 4) and the compressed gas pressure vessel 140 is limited (or prevented entirely). This prevents breach of the compressed gas pressure vessel 140 from depressurizing the remainder of the distributed fuel module 100.

Movement between the flow-unobstructed closed position A and the flow-obstructed open position B is according to a pressure differential 24 within the supply gaseous circuit breaker 148. The pressure differential 24 is defined between a static flow zone 28, located radially between the plurality of arcuate petals 174 and along the flow axis 176, and a dynamic flow zone 30, located radially outward of the static flow zone 28 and separated therefrom by the plurality of arcuate petals 174. When the pressure differential is below a predetermined value the plurality of arcuate petals 174 remain in the flow-unobstructed position A. When the pressure differential exceeds the predetermined pressure differential value the plurality of arcuate petals 174 move to the flow-obstructed position B, such as when the pressure differential 24 increase due to increased flow velocity of fluid through the dynamic flow zone 30 due to a breach in the compressed gas pressure vessel 140 (shown in FIG. 4). In certain embodiments the supply gaseous circuit breaker 148 be as shown and described in U.S. Pat. No. 8,191,571 B2, issued on Jun. 5, 2012, the contents of which is incorporated herein by reference in their entirety.

With continuing reference to FIG. 4, it is contemplated that the first gaseous circuit breaker 152, the first hydraulic circuit breaker 157, the second gaseous circuit breaker 154, and the second hydraulic circuit breaker 160 be similar in construction and operation to the supply gaseous circuit breaker 148. Specifically, the second hydraulic circuit breaker 160 is connected to the fuel port 173 of the second fuel pressure vessel 144 and the first gaseous circuit breaker 152 is connected to the gas port 164 of the first fuel pressure vessel 142 in cooperatively association to isolate the first fuel pressure vessel 142 from the compressed gas header 146 and the fuel header 156 according to a pressure differential 44 within first gaseous circuit breaker 152 and a pressure differential 46 within the first hydraulic circuit breaker 157, respectively. The cooperation association of the first gaseous circuit breaker 152 and the first hydraulic circuit breaker 157 causes each to close upon the acceleration of fluid flow from either (or both) the compressed gas header 146 and the fuel header 157 in the event of a breach developing in the first fuel pressure vessel 142. This allows the turboalternator 104 to continue operating, utilizing fuel from the second fuel pressure vessel 144 pressurized by the first compressed gas pressure vessel 140, notwithstanding a breach of the first fuel pressure vessel 142.

Similarly, the second hydraulic circuit breaker 160 is connected to the fuel port 173 of the second fuel pressure vessel 144 and second gaseous circuit breaker 154 is connected to the gas port 172 in cooperative association to isolate the second fuel pressure vessel 144 from the compressed gas header 146 and the fuel header 156 according to a pressure differential 52 within second gaseous circuit breaker 154 and a pressure differential 50 within the second hydraulic circuit breaker 160. The cooperation association of the second gaseous circuit breaker 154 and the second hydraulic circuit breaker 160 causes each to close upon the acceleration of fluid flow from either (or both) the compressed gas header 146 and the fuel header 157 due to the breach 40 in the second fuel pressure vessel 142. This allows the turboalternator 104 to continue operating, utilizing fuel from the first fuel pressure vessel 142 pressurized by the first compressed gas pressure vessel 140, notwithstanding the breach 40 (and depressurization) of the first fuel pressure vessel 142.

As will be appreciated, the supply gaseous circuit breaker 148 is associated with the compressed gas header 146 to isolate the compressed gas pressure vessel 140 from the compressed gas header 146 in the event a breach develops in the compressed gas pressure vessel 140. In the event of such breach the turboalternator 104 would continue to operate utilizing pressure supplied by a second compressed gas pressure vessel connected to the compressed gas header.

Figure 7:
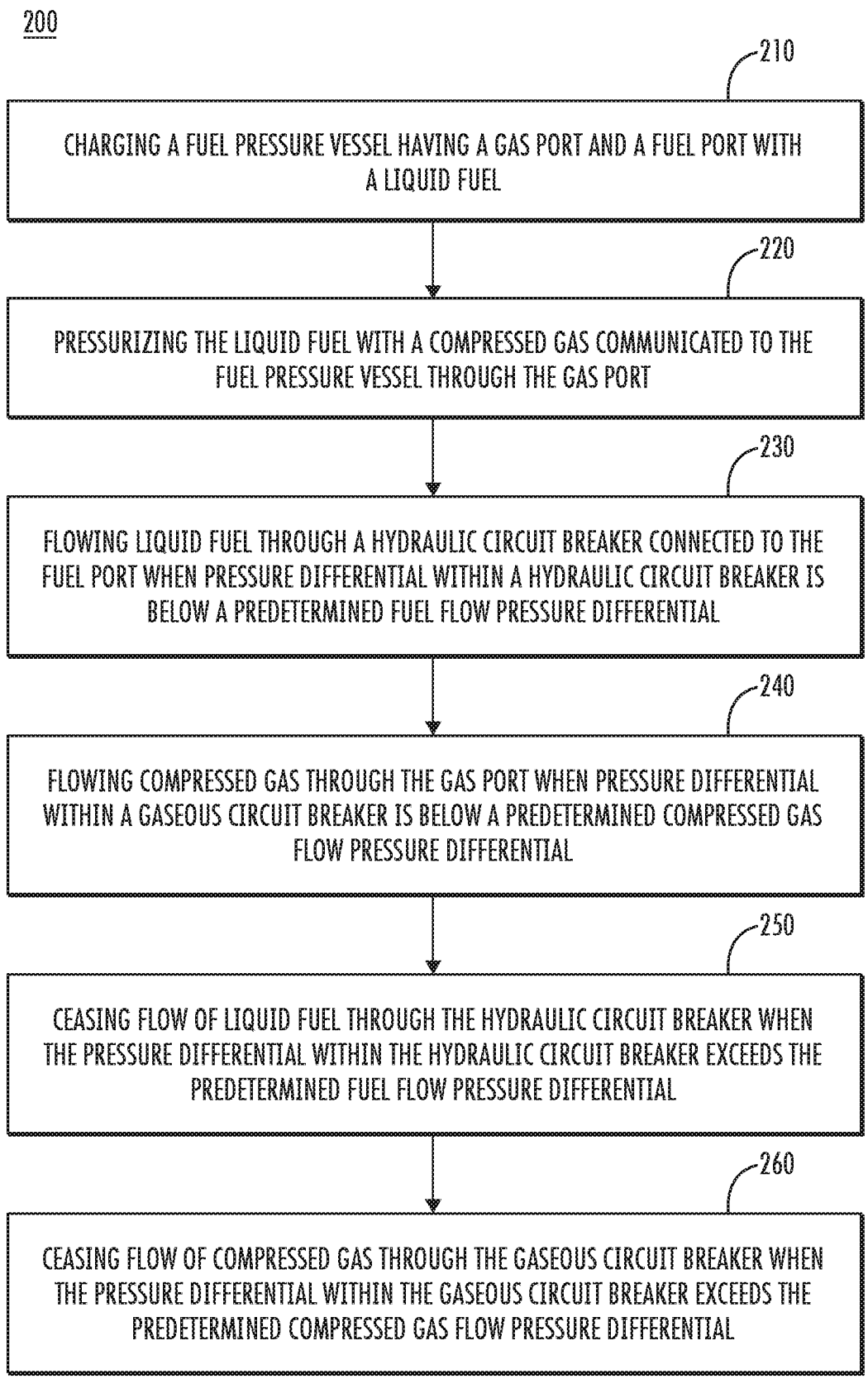
FIG. 7 is a block diagram of a method of controlling fuel flow in a distributed fuel module, showing steps of the method.

With reference to FIG. 7, a method 200 of controlling fuel flow with a distributed fuel module, e.g., the distributed fuel module 100 (shown in FIG. 1), is shown. As shown with box 210, the method 200 includes charging a fuel pressure vessel having a gas port and a fuel port with a liquid fuel, e.g., the first fuel pressure vessel 142 (shown in FIG. 3) and the second fuel pressure vessel 144 (shown in FIG. 3). Method 200 also includes pressurizing the liquid fuel with a compressed gas communicated to the fuel pressure vessel through the gas port, e.g., through the gas port 164 (shown in FIG. 3) or the gas port 172 (shown in FIG. 3), as shown with box 220.

The method 200 includes flowing liquid fuel through a hydraulic circuit breaker, e.g., the first hydraulic circuit breaker 157 (shown in FIG. 3) or the second hydraulic circuit breaker (shown in FIG. 3) connected to the fuel port when pressure differential within a hydraulic circuit breaker is below a predetermined fuel flow pressure differential, e.g., the pressure differential 44 (shown in FIG. 3) and/or the pressure differential 48 (shown in FIG. 3), as shown with box 230. Compressed gas is also communicated (i.e., flows) gas through the gas port when pressure differential within a gaseous circuit breaker, e.g., the first gaseous circuit breaker 152 (shown in FIG. 3) and the second gaseous circuit breaker 154 (shown in FIG. 3) is below a predetermined compressed gas flow pressure differential, e.g., the pressure differential 50 (shown in FIG. 3) and the pressure differential 52 (shown in FIG. 3), as shown with box 240.

The flow of liquid fuel through the hydraulic circuit breaker ceases when the pressure differential within the hydraulic circuit breaker exceeds the predetermined fuel flow pressure differential, as shown with box 250. The flow of compressed gas through the gaseous circuit breaker when the pressure differential within the gaseous circuit breaker exceeds the predetermined compressed gas flow pressure differential, as shown with box 260. For example, upon the second fuel pressure vessel developing a breach 40 (shown in FIG. 4), the second hydraulic circuit breaker separates the second fuel pressure vessel from the first hydraulic pressure vessel, thereby mitigating the breach by preventing depressurization of the remainder of the distributed fuel module 100 and allowing the power module 106 to continue to generate electrical notwithstanding the breach.

With the advent of directed energy weapons, soldier exoskeletons, and robotic pack mules the demand for mobile electric power has increased. Rechargeable batteries are generally too large and heavy to support the power requirements of these devices. Accordingly, applicant proposes to provide a wearable power module to generate electric power using a microturbine. The microturbine is provides a flow of fuel from fuel module including two of more fuel pressure vessels, which are distributed to accommodate placement of cargo back on the upper shoulders of a user.

In embodiments described herein a hydraulic circuit breaker is employed to control the flow of liquid fuel to the microturbine. In certain embodiments a compressed gas, e.g., nitrogen, is used to pressurize a mono-propellant fuel such as hydrazine or Otto fuel. In accordance with certain embodiments the mono-propellant or fuel is provided to a decomposition or combustion chamber, which converts the chemical contained within the mono-propellant or liquid fuel into thermal energy. A highly efficient single stage impulse turbine coverts the thermal energy into mechanic energy, which is used to drive a permanent magnet generator. While the distributed fuel module is pressurized hydraulic circuit breakers cooperate with gaseous circuit breakers to supply the decomposition or combustion chamber with a flow of mono-propellant or fuel while preventing, by selectively isolating sections of the fuel module, complete depressurization of the fuel module in the event that one of the fuel pressure vessels is breached or ruptured.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A distributed fuel module, comprising:
a fuel pressure vessel with a gas port and a fuel port;
a hydraulic circuit breaker connected to the fuel port; and
a gaseous circuit breaker connected to the gas port and fluidly coupled with the hydraulic circuit breaker through the fuel pressure vessel,
wherein the hydraulic circuit breaker is cooperatively associated with the gaseous circuit breaker to isolate the fuel pressure vessel from a compressed gas header and a fuel header according to a pressure differential within the hydraulic circuit breaker and a pressure differential within the gaseous circuit breaker;
wherein the gaseous circuit breaker is movable between a flow-unobstructed open position, wherein the gaseous circuit breaker does not obstruct flow into the gas port, and a flow-obstructed closed position, wherein the gaseous circuit breaker prevents gas flow into the fuel pressure vessel.

2. The distributed fuel module as recited in claim 1, wherein the hydraulic circuit breaker comprises a plurality of arcuate petals supported along a flow axis, each of the plurality of arcuate petals movable between a flow-unobstructed open position, wherein the hydraulic circuit breaker does not obstruct flow into the fuel port, and a flow-obstructed closed position, wherein the hydraulic circuit breaker prevents fuel flow into the fuel port.

3. The distributed fuel module as recited in claim 1, wherein the gaseous circuit breaker comprises a plurality of arcuate petals supported along a flow axis, each of the plurality of arcuate petals movable between the flow-unobstructed open position and the flow-obstructed closed position.

4. The distributed fuel module as recited in claim 1, further comprising a pressure regulator connected to the fuel pressure vessel by the gaseous circuit breaker.

5. The distributed fuel module as recited in claim 1, further comprising a turbine speed control valve connected to the fuel pressure vessel by the hydraulic circuit breaker.

6. The distributed fuel module as recited in claim 1, further comprising the fuel header, wherein the fuel header is connected to the fuel pressure vessel by the hydraulic circuit breaker.

7. The distributed fuel module as recited in claim 1, further comprising the compressed gas header, wherein the compressed gas header is connected to the fuel pressure vessel by the gaseous circuit breaker.

8. The distributed fuel module as recited in claim 1, further comprising:
 a liquid fuel charge contained within the fuel pressure vessel; and
 a compressed gas charge contained within the fuel pressure vessel, the compressed gas charge urging the liquid fuel charge toward the fuel port of the fuel pressure vessel.

9. The distributed fuel module as recited in claim 1, wherein a liquid fuel flow through the hydraulic circuit breaker is operatively associated with the hydraulic circuit breaker.

10. The distributed fuel module as recited in claim 1, wherein a compressed gas flow through the gaseous circuit breaker is operatively associated with the gaseous circuit breaker.

11. The distributed fuel module as recited in claim 1, wherein the fuel pressure vessel is a first fuel pressure vessel, the hydraulic circuit breaker is a first hydraulic circuit breaker, and the gaseous circuit breaker is a first gaseous circuit breaker, wherein the distributed fuel module further comprises:
 a second fuel pressure vessel with a gas port and a fuel port;
 a second hydraulic circuit breaker connected to the fuel port of the second fuel pressure vessel; and
 the fuel header, wherein the fuel header connects the first hydraulic circuit breaker with the second hydraulic circuit breaker;
 a second gaseous circuit breaker connected to the gas port of the second fuel pressure vessel; and
 the gas header, wherein the gas header connects the first gaseous circuit breaker with the second gaseous circuit breaker.

12. The distributed fuel module as recited in claim 1, further comprising:
 a compressed gas pressure vessel with a gas port; and
 a gas header gaseous circuit breaker connected to the gas port of the compressed gas pressure vessel; and
 the gas header, wherein the compressed gas header connects the gas header gaseous circuit breaker to the gaseous circuit breaker.

13. The distributed fuel module as recited in claim 1, wherein the fuel pressure vessel has no additional ports beyond the gas port and the fuel port.

14. A power module, comprising:
 a distributed fuel module as recited in claim 1, wherein a liquid fuel charge is contained within the fuel pressure vessel, and wherein a compressed gas charge is contained within the compressed gas pressure vessel and the fuel pressure vessel, the compressed gas charge urging the liquid fuel charge toward the fuel port of the fuel pressure vessel;
 a pressure regulator fluidly coupled to the fuel pressure vessel through the gaseous circuit breaker by the compressed gas charge; and
 a turbine speed control valve fluidly coupled to the fuel pressure vessel through the hydraulic circuit breaker by the liquid fuel charge;
 a gas generator fluidly connected to the turbine speed control valve;
 a turbine fluidly connected to the gas generator; and
 an electric generator operatively associated with the turbine for generating electrical power using the fuel charge contained in the fuel pressure vessel and urged toward the turbine speed control valve by the compressed gas charge contained in the fuel pressure vessel.

15. The power module as recited in claim 14, further comprising:
 the fuel header fluidly coupled to the fuel pressure vessel through the hydraulic circuit breaker by the liquid fuel charge,
 wherein a liquid fuel flow through the hydraulic circuit breaker is operatively associated with the hydraulic circuit breaker; and
 the compressed gas header fluidly coupled to the fuel pressure vessel through the gaseous circuit breaker by the compressed gas charge, wherein a compressed gas flow through the gaseous circuit breaker is operatively associated with the gaseous circuit breaker.

16. The power module as recited in claim 14, wherein the gas generator comprises a decomposition chamber configured to decompose a mono-propellant carried to the gas generator by the liquid fuel charge.

17. The power module as recited in claim 14, wherein the gas generator comprises a combustion chamber configured to oxidize liquid fuel carried to the gas combustion chamber by the liquid fuel charge.

\* \* \* \* \*